US008051721B2

(12) United States Patent
Amir

(10) Patent No.: US 8,051,721 B2
(45) Date of Patent: Nov. 8, 2011

(54) SHOCK SENSOR SYSTEM AND METHOD

(75) Inventor: Haim Amir, Ramat Hasharon (IL)

(73) Assignee: Essence Security International Ltd. (E.S.I.), Herzliya (IL)

( * ) Notice: Subject to any disclaimer, the term of this patent is extended or adjusted under 35 U.S.C. 154(b) by 105 days.

(21) Appl. No.: 12/125,178

(22) Filed: May 22, 2008

(65) Prior Publication Data

US 2009/0288501 A1 Nov. 26, 2009

(51) Int. Cl.
*G01N 3/02* (2006.01)

(52) U.S. Cl. .......................................... 73/856

(58) Field of Classification Search ............. 73/856, 73/12.01–12.06
See application file for complete search history.

(56) References Cited

U.S. PATENT DOCUMENTS

| | | | | |
|---|---|---|---|---|
| 3,577,020 A | * | 5/1971 | Carlson et al. | 310/330 |
| 4,989,462 A | * | 2/1991 | Davis et al. | 73/862.53 |
| 5,114,060 A | * | 5/1992 | Boyer | 224/413 |
| 5,612,670 A | | 3/1997 | Snyder et al. | |
| 5,983,724 A | * | 11/1999 | Yoshida | 73/652 |
| 6,272,901 B1 | * | 8/2001 | Takeuchi et al. | 73/12.01 |
| 6,396,163 B1 | * | 5/2002 | Sugiura et al. | 307/9.1 |
| 6,553,807 B2 | * | 4/2003 | Luk et al. | 73/12.09 |
| 6,633,454 B1 | * | 10/2003 | Martin et al. | 360/132 |
| 6,737,979 B1 | | 5/2004 | Smith et al. | |
| 6,856,130 B2 | * | 2/2005 | Sondergeld | 324/207.15 |
| 7,415,891 B2 | * | 8/2008 | Santos et al. | 73/856 |
| 7,562,575 B2 | * | 7/2009 | Hatano et al. | 73/526 |
| 7,730,764 B2 | * | 6/2010 | Tachibana et al. | 73/12.06 |

OTHER PUBLICATIONS

New LIFEBOOK Series features Shock Sensor Utility Eco Power Saving Utility-White Paper, Fujitsu-Siemens Computers, Oct. 2007, pp. 2 and 3.

* cited by examiner

*Primary Examiner* — Lisa Caputo
*Assistant Examiner* — Octavia Davis
(74) *Attorney, Agent, or Firm* — Mark M. Friedman

(57) ABSTRACT

A surface-mountable shock sensor configuration having substantially eliminated field calibration, comprising: a housing assembly; and a shock sensor replaceably mountable within the housing assembly, wherein the shock sensor configuration yields a repeatable shock response for a plurality of shock sensors, in response to shocks applied to a surface upon which the sensor configuration is mounted.

11 Claims, 10 Drawing Sheets

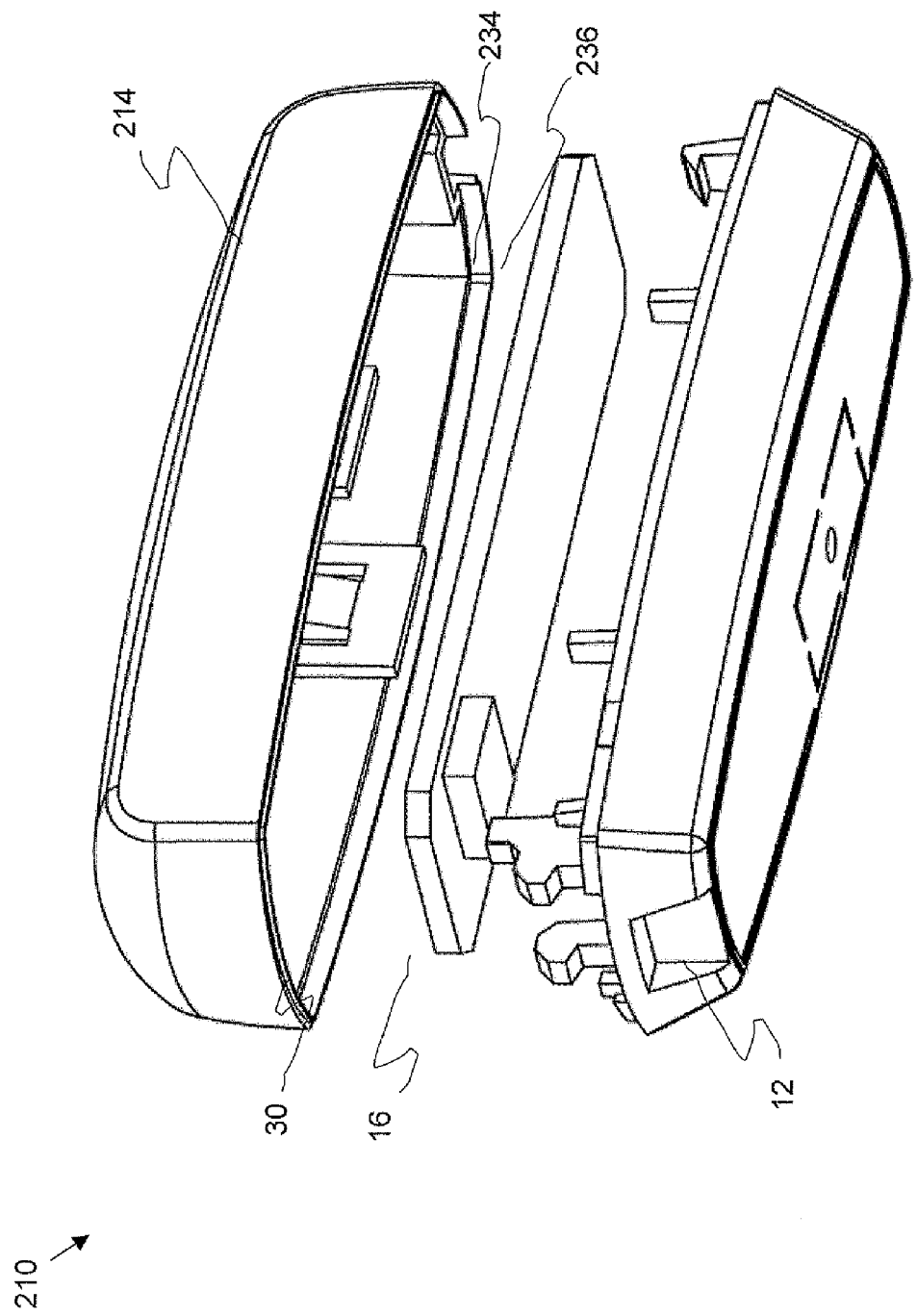

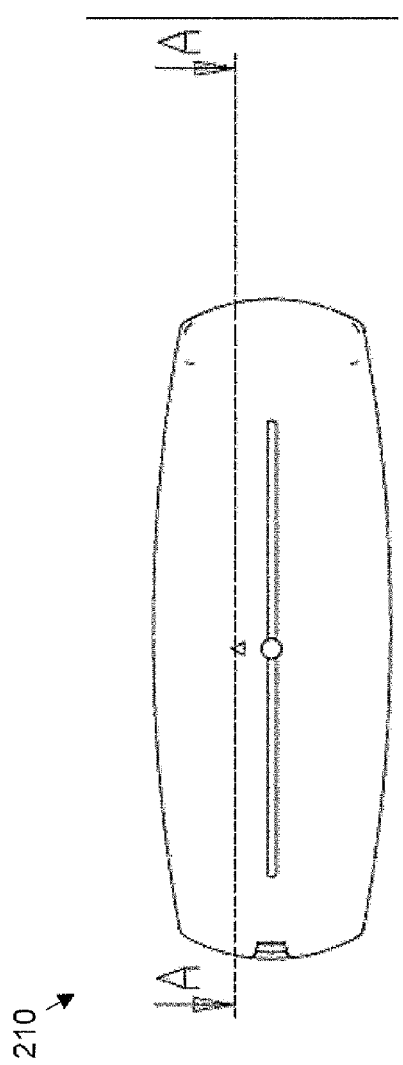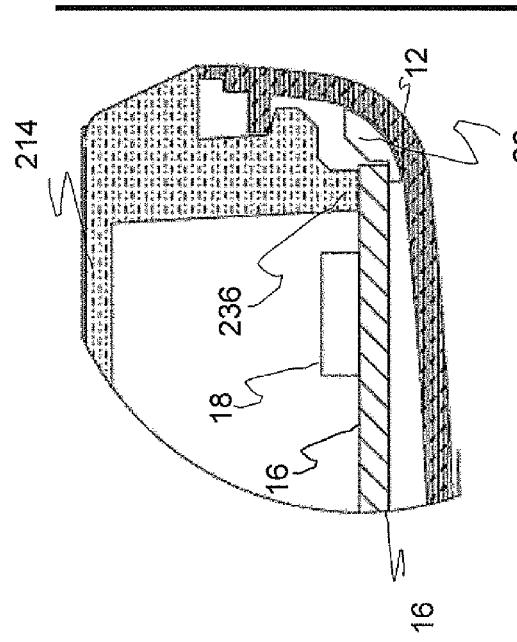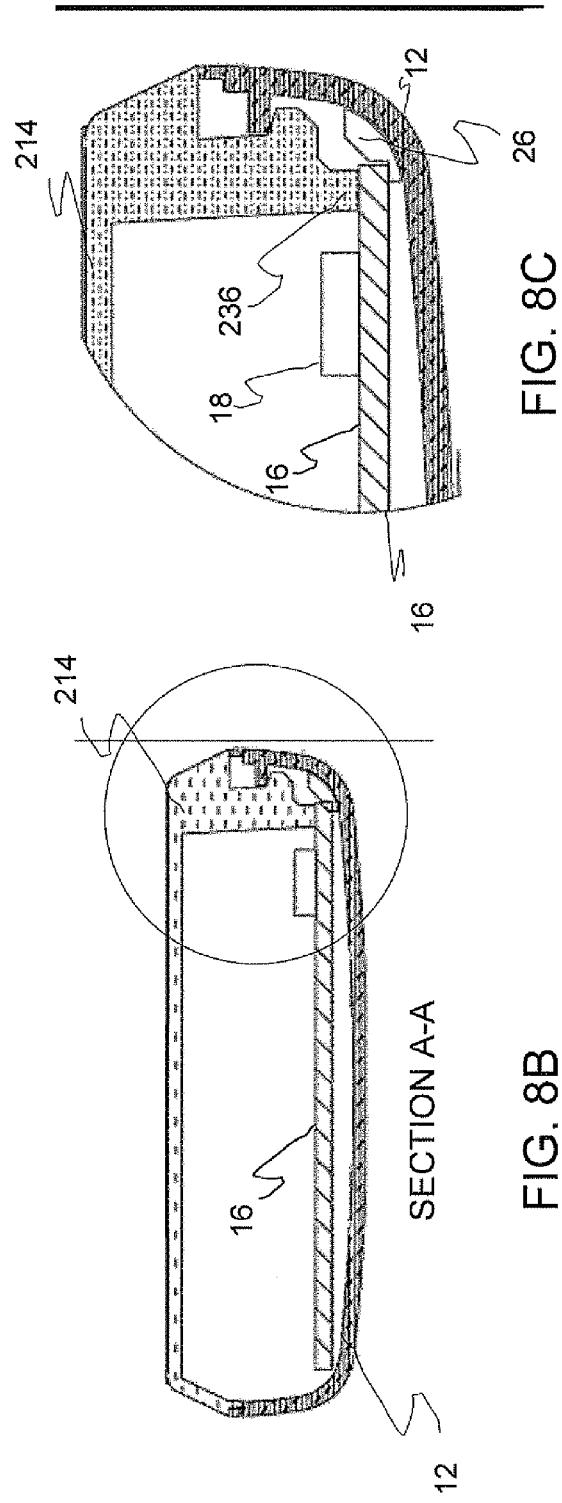

SHOCK SENSOR SYSTEM AND METHOD

FIELD AND BACKGROUND OF THE INVENTION

The present invention relates to a shock sensor system and method, and in particular, it concerns a shock sensor configuration that enjoys significant reduction or elimination of field calibrations.

Shock sensors are used in many applications to monitor or detect shock forces imparted to an object that is fragile, under investigation, and/or of value. Additionally, shock sensors may be used to monitor security environments, such as glass surfaces, windows, and doors for example to indicate when a glass surface is tampered with or a shock is applied. Shock sensors as known in the art are frequently accelerometers utilizing sensing materials placed on a thin diaphragm with a proof mass attached to the diaphragm. Some of these devices also utilize materials having a piezoelectric effect. One frequent use of mechanical shock detection devices is in the field of indicator alarms. Such alarms include those for sensing movement, time, temperature and a number of other physical parameters. Examples of prior art are U.S. Pat. No. 6,737,979 to Smith et, al. and U.S. Pat. No. 5,612,670 to Snyder et al., whose disclosure is incorporated herein by reference.

Shock sensors are typically packaged in an inexpensive housing, frequently made of a range of plastic or other lower cost materials. Upon field installation of the sensor, the housing is attached to the surface and/or item to be monitored. In order to reduce cost, shock sensors are frequently manufactured with nominal electro-mechanical responses that cannot be substantially changed once the sensor is fabricated and subsequently field installed. In most cases, when the sensor, installed in its housing, together hereinbelow referred to in the specification and in the claims which follow as a "housing assembly", a "sensor housing assembly", and a "sensor configuration", is field-installed as part of an alarm system, care must be taken to securely mount the housing assembly to the surface to be monitored.

Furthermore, the response of the housing assembly is very frequently calibrated upon installation, such as, but not limited to test shocks with an object of know mass to the surface on which the housing assembling is mounted, to ensure a repeatable shock response, so that the overall alarm system provides the desired sensitivity and/or robustness to fulfill its purpose. The term "field calibration" as used hereinbelow in the specification and in the claims which follows, is intended to mean primarily the installation calibration referred to in the previous sentence. The term "repeatable shock response", as used in the specification and in the claims which follow, is intended to mean a consistent and repeatable response of the sensor housing, usually, but not always, a measure of the output signal of the shock sensor of the housing in response to test shocks applied to the surface upon which the housing is attached. Consistency and repeatability of the response is determined by any number of numerical and/or statistical techniques.

An exemplary shock sensor field calibration routine may be found in "New LIFEBOOK Series features Shock Sensor Utility Eco Power Saving Utility—White Paper", Fujitsu-Siemens Computers, October 2007, pages 2 and 3, whose disclosure is incorporated by reference.

An example of a sensor configuration may be found in Snyder et al. in U.S. Pat. No. 5,612,670, whose disclosure is incorporated by reference. Snyder describes an aftermarket (i.e. retrofit) shock sensor configuration that may be used in automobiles. The configuration described comprises a configuration of circuits, inter alia, to give two separately adjustable thresholds to control overall sensor shock sensitivity. However, there is no discussion of details of the sensor housing assembly or of uniformity of its response to shocks.

The need for field calibrations brings with it concomitant expense, as such calibrations must be performed by individuals having a certain level of skill and attention. Qualified personnel, who are typically more highly-paid, are required for this type of work. Furthermore, additional instrumentation may also be needed for such field calibrations. Clearly, the time and expense related to field calibrations represents a significant cost component of an alarm system. If field calibrations for a sensor housing assembly may be reduced in scale or even eliminated, corresponding costs may be reduced for the system installer, and this cost reduction may also yield a lower price for the customer.

There is therefore a need for a shock sensor configuration with repeatable shock response that allows significant reduction and/or elimination of field calibrations.

SUMMARY OF THE INVENTION

The present invention relates to a shock sensor system and method, and in particular, it concerns a shock sensor configuration that that enjoys significant reduction and/or elimination of field calibrations.

According to the teachings of the present invention there is provided, a surface-mountable shock sensor configuration having substantially eliminated field calibration, comprising: housing assembly; and a shock sensor replaceably mountable within the housing assembly, wherein the shock sensor configuration yields a repeatable shock response for a plurality of shock sensors, in response to shocks applied to a surface upon which the sensor configuration is mounted. Preferably, the sensor configuration has a top and a bottom cover. Most preferably, the sensor configuration is made from a low cost material. Typically, the surface-mountable shock sensor configuration includes an internal a clip, the clip acting to securely retain the shock sensor within the housing. Most typically, the clip includes a protuberance designed to enhance the transference of mechanical energy from the sensor configuration to the shock sensor.

Preferably, the repeatable shock response is determinable from a pulse width range of the shock sensors. Most preferably, the protuberance yields a substantially reduced pulse width range compared to the pulse width range of shock sensor configurations without the protuberance.

According to the teachings of the present invention there is further provided a method of obtaining a repeatable shock response for a plurality of shock sensors, in response to shocks applied to a surface upon which a sensor configuration is mounted, comprising the steps of: taking a housing assembly; and mounting a replaceable shock sensor within the housing assembly, thereby substantially eliminating field calibration of the sensor configuration. Preferably, the sensor configuration has a top and a bottom cover. Most preferably, the sensor configuration is made from a low cost material. Typically, an internal clip is configured internal to the sensor configuration, the clip acting to securely retain the shock sensor within the housing. Most typically, a protuberance is formed on the internal clip, the protuberance designed to enhance the transference of mechanical energy from the sensor configuration to the shock sensor. Preferably the repeatable shock response is determined from a pulse width range of the shock sensors. Most preferably, the protuberance yields a substantially reduced pulse width range compared to the pulse width range of shock sensor configurations without the protuberance.

BRIEF DESCRIPTION OF THE DRAWINGS

The invention is herein described, by way of example only, with reference to the accompanying drawings, wherein:

FIGS. 6, 7, 8A-C are pictorial representations, a top view, and cross sectional views of an improved shock sensor housing, in accordance with an embodiment of the present invention respectively.

DESCRIPTION OF PREFERRED EMBODIMENTS

Figure 1:
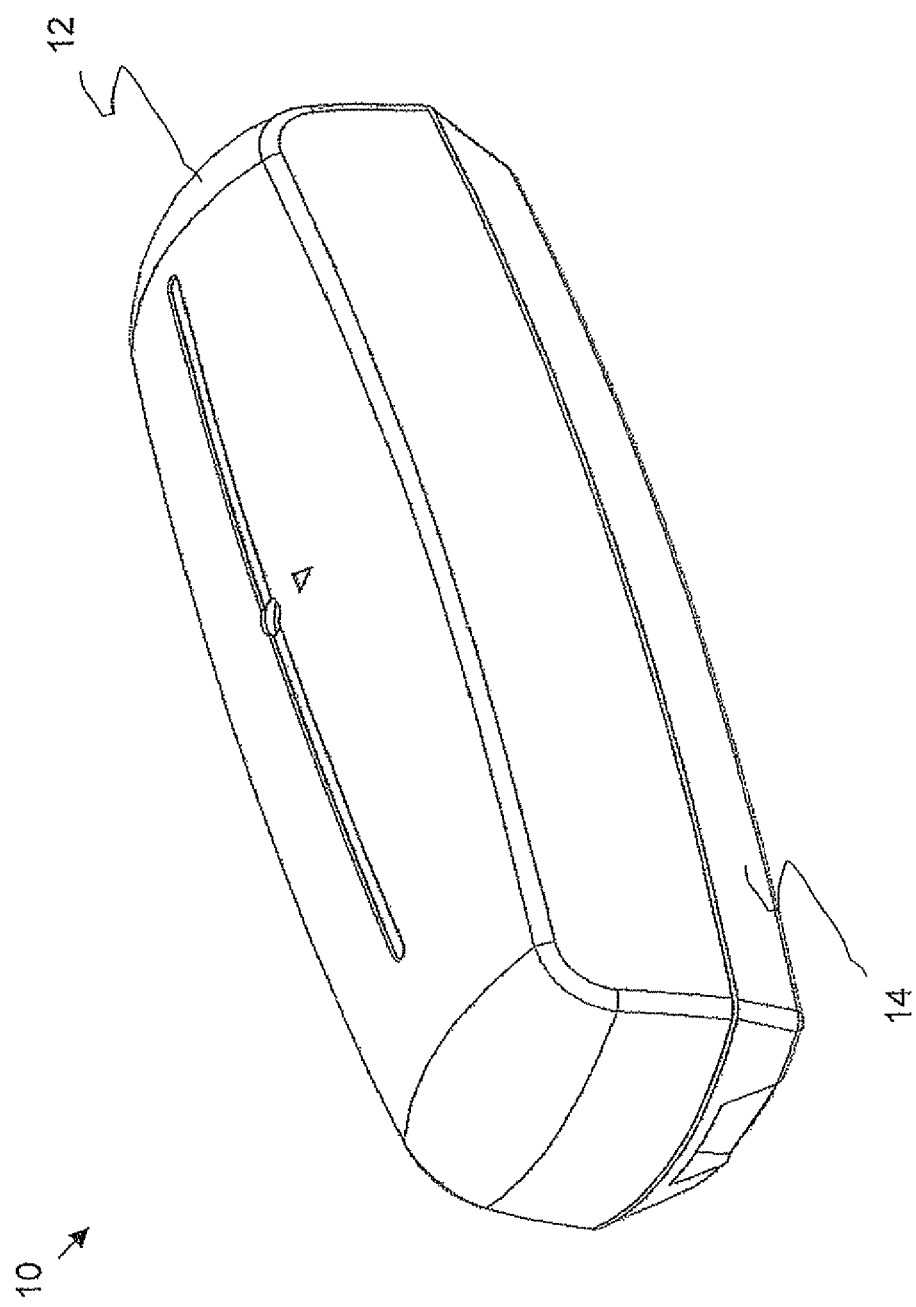
FIGS. 1 to 4 are pictorial representations of typical shock sensor housing.
Figure 2:
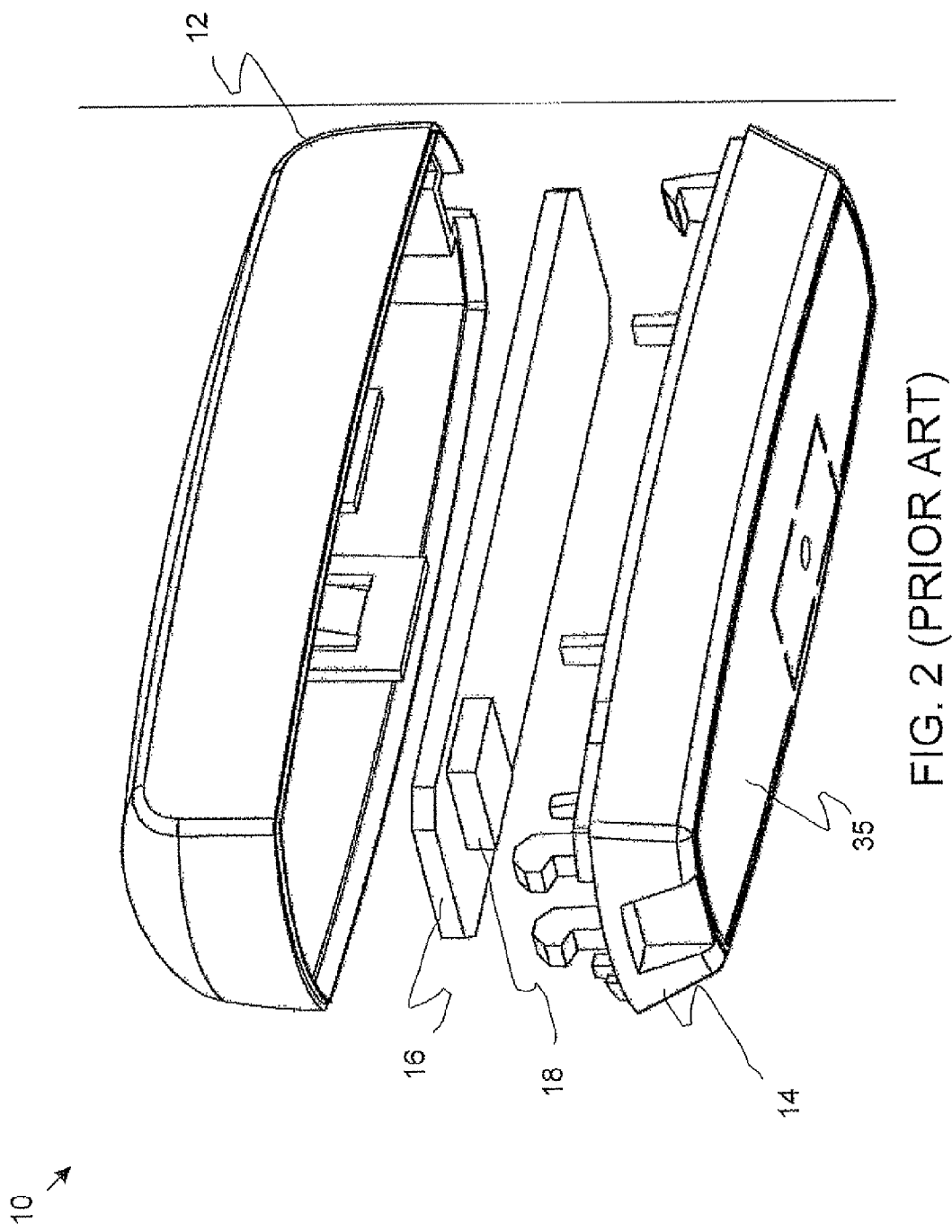
Figure 3:
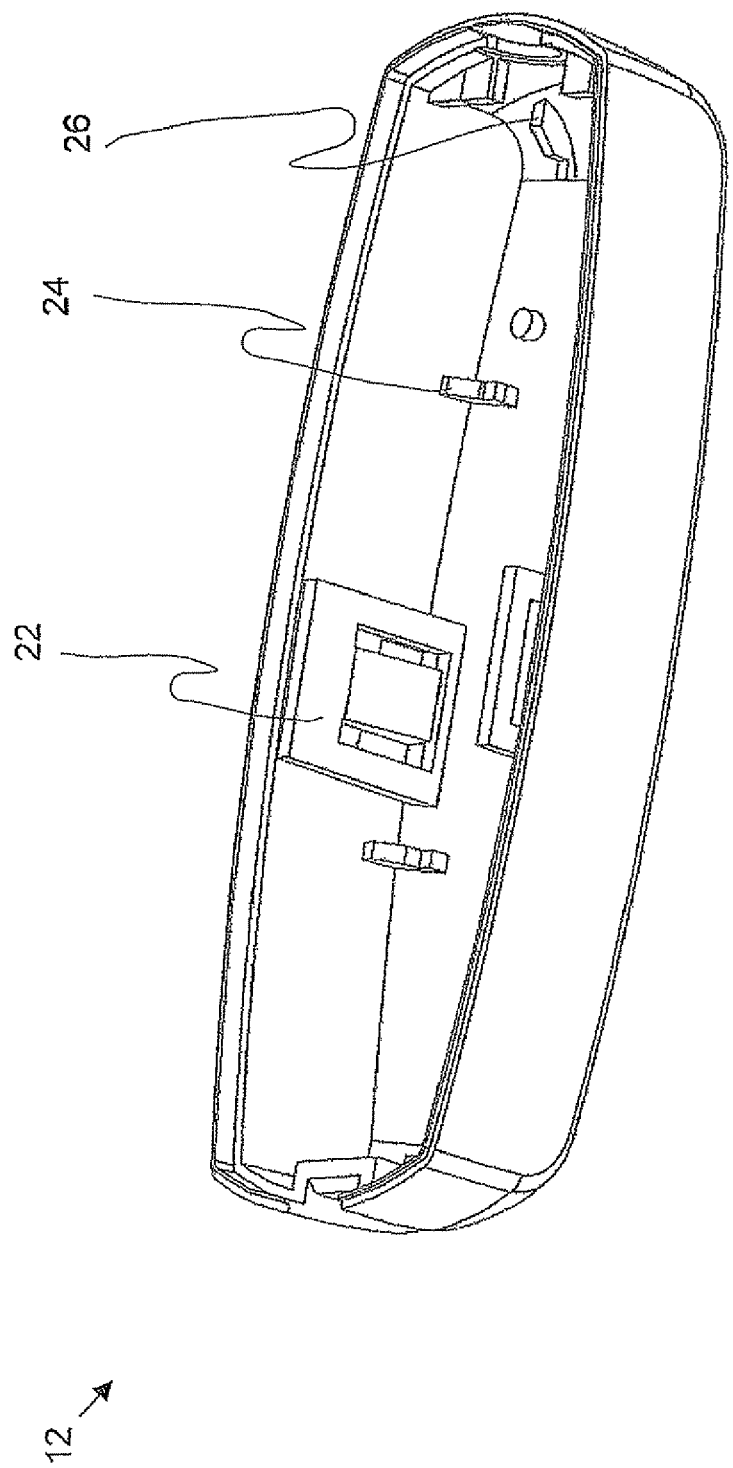
Figure 4:
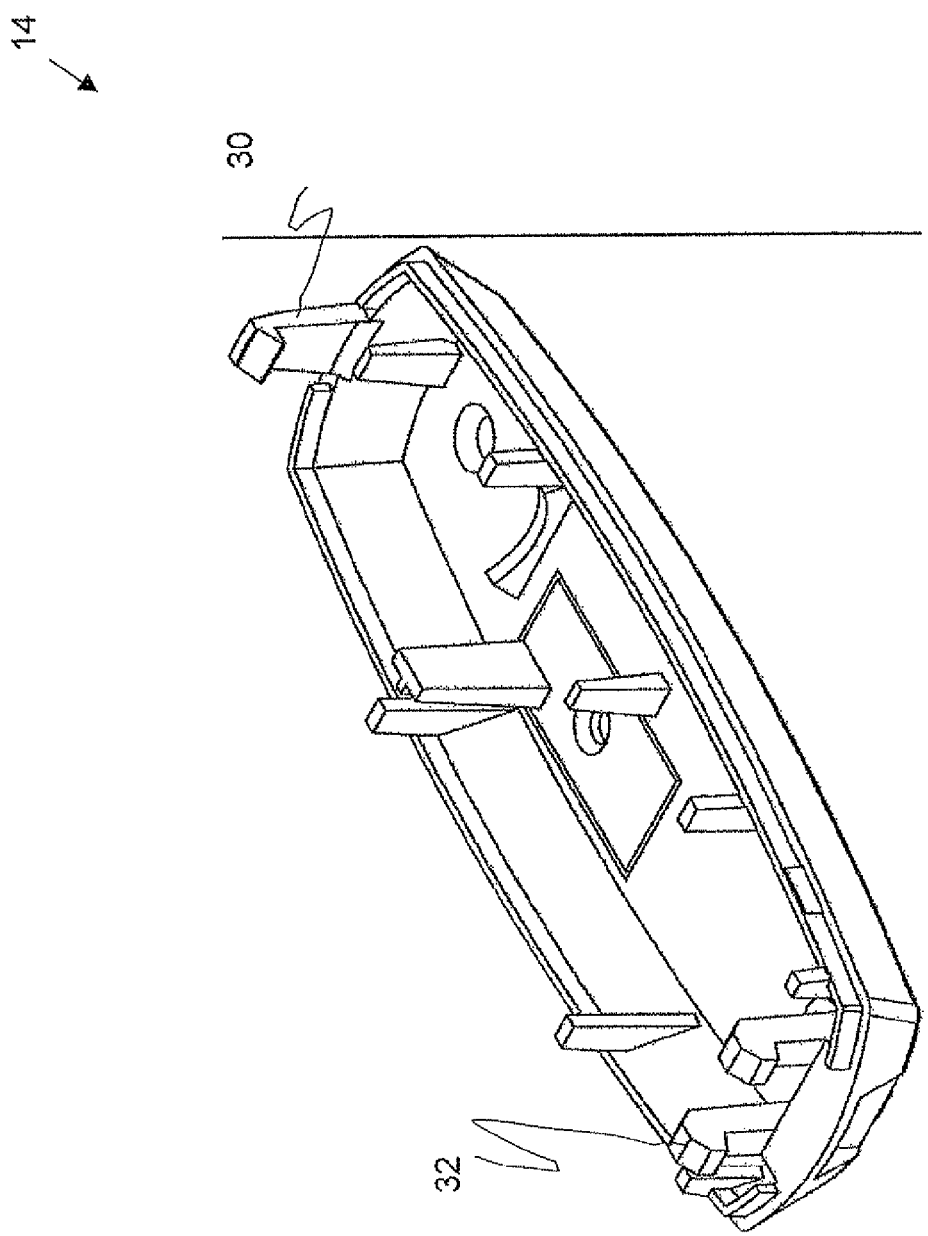

The present invention includes a shock sensor system and method, and in particular, it concerns a shock sensor configuration that enjoys significant reduction or elimination of installation and other field calibrations.

In the specification and claims which follow, the term "shock sensor housing" is meant to mean the housing, typically fabricated from plastic or other lower cost materials, which supports and protects the shock sensor and its associated electronic circuitry. The shock sensor electronic circuitry is usually in the form of a printed circuit board (PCB), upon which a shock sensor is typically mounted, as known in the art.

Reference is now made to FIGS. 1 to 4, which are pictorial representations of a shock sensor housing 10, as known in the art. Shock sensor housing 10, in the exemplary figures, comprises an upper cover 12, a base 14, and a PCB 16, upon which is mounted shock sensor 18. The PCB typically has a number of electronic components mounted upon it, such as but not limited to communications, power source (i.e., batteries), and logic devices (all not show). When upper cover 12, and base 14 are clipped together by clips 30 and 32, PCB 16 is supported within the upper cover and the base by a retainer 22 and by supports 24 and 26. Typically, sensor housing is intimately mounted to a surface (not shown) by a double-sided adhesive (or any other suitable adhering means known in the art) applied to an outer surface 35 of the base, seen in FIG. 2. Typically, sensor housing 10 is adhered to a window, for example, and the sensor housing communicates with an alarm system, both receiving commands and sending telemetry signals. Shock sensor 18 is designed to sense vibrations and shocks. The electronic components mounted on the PCB are designed, inter alia, to translate the output of the shock sensor, nominally in milli-volts (mV), to a telemetry signal to the alarm system. In this aspect of operation, sensor housing 10 is designed to be an integral part of the alarm system, by sensing vibrations and shocks and by transferring signals related to the vibrations and shocks to the alarm system.

Figure 5:
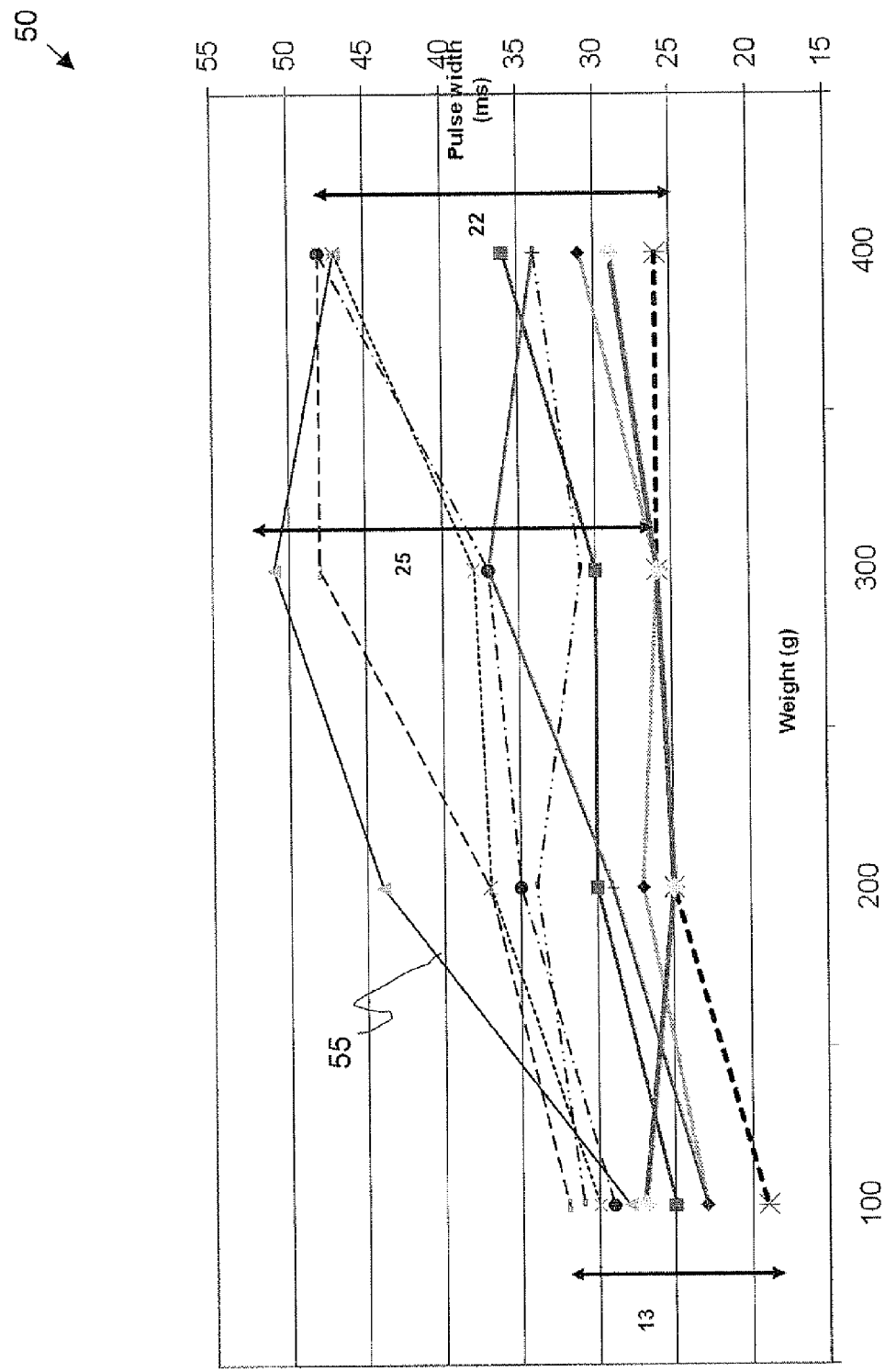
FIG. 5 is a graphical representation of experimental results obtained for a number of shock sensor housings, such as the housing shown in FIGS. 1 to 4.

Reference is now made to FIG. 5, which is a graphical representation 50 of experimental results obtained for a number of shock sensor housings, such as the housing of FIGS. 1 to 4. As noted hereinabove, field calibration of the sensor housing installed as described hereinabove may involve performing a number of test shocks with an object of know mass to the surface on which the housing assembling is mounted. The graphical representation shows a number of data lines 55 (in this case, 10 data lines), each data line indicative of an installed individual shock sensor housing having a shock sensor output duration or "pulse width" (expressed in milliseconds, ranging from approximately 20 to 50 ms) in response to shocks produced with masses of known weights of 100, 200, 300 and 400 g, as indicated in the horizontal axis. The individual shock sensor housings are securely mounted to a window glass, the glass having a thickness of 3 mm and a width and height of 50×100 cm, respectively. The window is aluminum-framed. (The window is not shown.) It can be seen that for shocks corresponding to 100 g, installed shock sensor housings yield a range of responses to shocks, of about 13 ms. Similarly, fixed shocks corresponding to 300 and 400 g yield response ranges of 25 ms and 22 ms, respectively, as indicated.

Ideally, the shock responses of similar housings should be as repeatable as possible; meaning a number of shock sensor housings should yield a substantially identical response to shocks corresponding to given masses. Graphical representation 50 is an example of a non-repeatable shock response across a number of shock sensor housings. Assuming that the shock sensor housings yielding the data of graphical representation 50 have been consistently adhered to the surface (as described hereinabove) and that shocks have been consistently applied for the given masses, such a non-repeatable shock response could be indicative of an inconsistency in manufacturing of the sensor housings. Such an manufacturing inconsistency could be dealt with in the field by one or more of the following activities: replacing a sensor housing with a sensor housing having a more desirable shock response; calibrating the alarm system, if possible, to correct for a sensor housing having a skewed shock response; and both replacement and calibration. Any one or more of these activities have associated penalties in terms of time and cost.

Clearly, if a way could be found to correct the inconsistency, then sensor housings could be field installed in a more timely and cost-effective manner.

Figure 6:
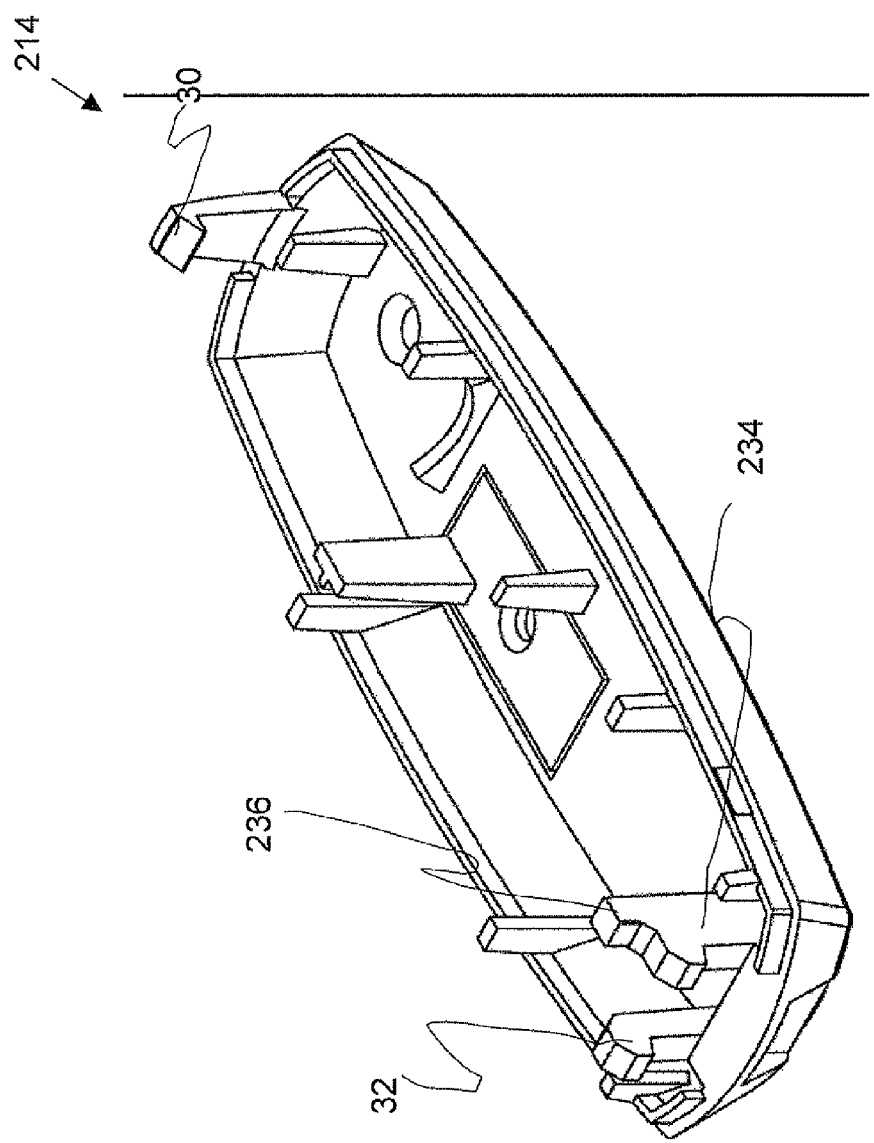

Reference is now made to FIGS. 6, 7, 8A, which are pictorial representations, a top view, and sectional views of an improved shock sensor housing 210 and an improved base 214, in accordance with an embodiment of the present invention. Apart from differences described below, shock sensor housing 210 and improved base 214 are generally similar to the shock sensor housing an the base shown in FIGS. 1, 2, and 4, and elements indicated by the same reference numerals are generally identical in configuration, operation, and functionality as described hereinabove. Clip 234 functions similarly to clip 32 (refer to FIG. 4), serving to retain base 214 to upper cover 12. However, a protuberance 236 has been added to the clip 32, as shown in the figure. Protuberance 236 serves to positively contact and bias PCB 16 against support 12 when the base is clipped to the upper cover, as shown in sectional views FIGS. 8B and 8C. The resultant positive contact and bias serve to create additional contact pressure of PCB 16 with the base and top cover, thereby improving the transfer of mechanical vibrations from the base to the PCB and to sensor 18.

Figure 9:
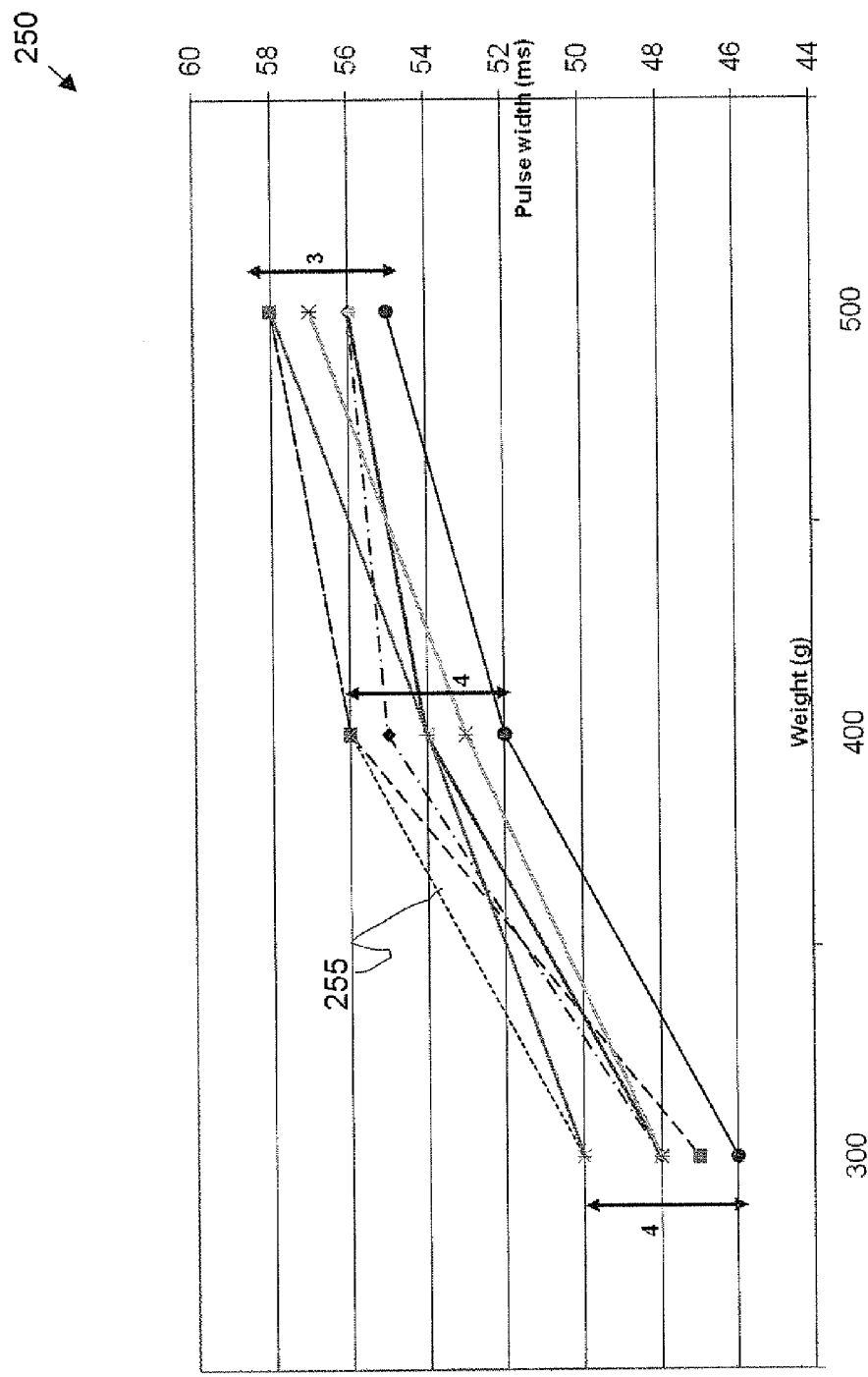
FIGS. 9 and 10 are graphical representations of experimental results obtained from the improved shock sensor housing shown in FIGS. 6-8C, in accordance with an embodiment of the present invention.
Figure 10:
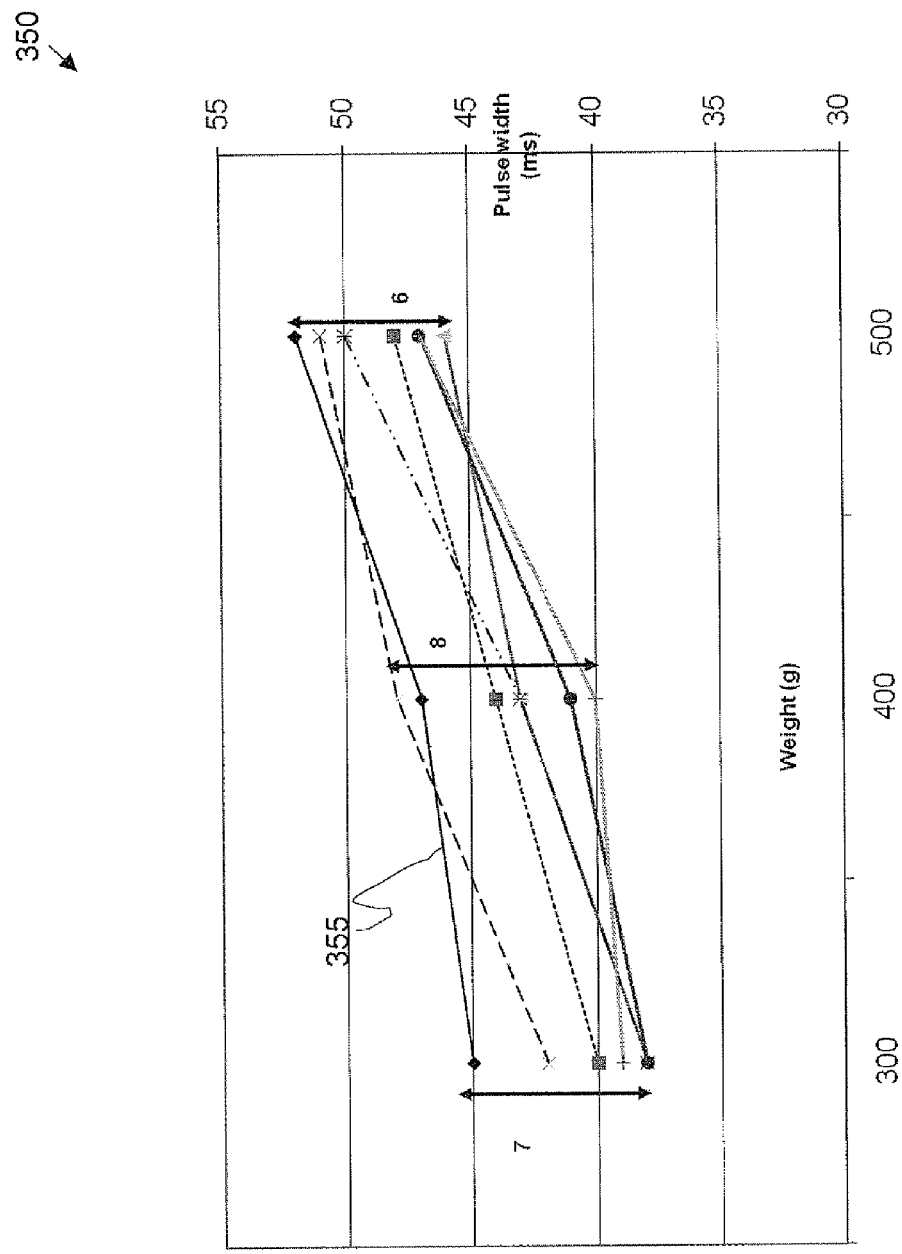

Reference is now made to FIGS. 9 and 10, which are graphical representations 250 and 350 of experimental results obtained from the improved shock sensor housing shown in FIGS. 6-8C, in accordance with an embodiment of the present invention. Apart from differences described below, graphical representations 250 and 350 are representative of tests generally similar to those performed and described hereinabove to yield the graphical representation shown in FIG. 5.

Graphical representations 250 and 350 show, respectively, a number of data lines 255 and 355, respectively (in both cases case, 7 data lines), each data line indicative of an installed individual shock sensor housing having a pulse width indicative of shock sensor output (the pulse width expressed in ms, as noted hereinabove for FIG. 5) in response to shocks produced with masses of known weights of 300, 400, and 500 g, as indicated in the horizontal axes. In representation 255, corresponding to a test performed on a 3-mm thick aluminum-framed window measuring 50×80 cm (not shown in the figure) it can be seen that for shocks corresponding to 300 g, installed shock sensor housings yield a range of responses to shocks, of about 4 ms. Similarly, fixed shocks corresponding to 400 and 500 g yield response ranges of 4 ms and 3 ms, respectively, as indicated. Similarly, in representation 355, corresponding to a test performed on a 3-mm thick aluminum-framed window measuring 80×120 cm (not shown in the figure) it can be seen that for shocks corresponding to 300 g, installed shock sensor housings yield a range of responses to shocks, of about 7 ms. Similarly, fixed shocks corresponding to 400 and 500 g yield response ranges of 8 ms and 6 ms, respectively, as indicated.

It can be seen that the pulse width range of improved sensor housing is substantially smaller, i.e. approximately one third or less, than the pulse width range of the sensor housing shown in FIGS. 1-4.

Graphical representation 250 and 350 exhibit response ranges that are substantially smaller than those seen from the results shown in FIG. 5, corresponding to the non-improved shock sensor housing without the protuberance. In other words, improved shock sensor housing 210, having the protuberance, shows a repeatable shock response, which is highly advantageous for field installation and which contributes to obviating field calibrations.

Although the data above reflects experiments performed using masses ranging from approximately 100 to 500 g and for windows measuring approximately 50×120 cm, it is expected that a similar improved shock response repeatability would be obtained in scalable systems, meaning with substantially larger and smaller weights and with larger and smaller window sizes for a scaled shock sensor housing, mutatis mutandis.

It will be appreciated that the above descriptions are intended only to serve as examples, and that many other embodiments are possible within the scope of the present invention as defined in the appended claims.

What is claimed is:

1. A surface-mountable shock sensor configuration for replaceably mounting a shock sensor of a plurality of shock sensors, the configuration comprising:
   (a) a housing assembly;
   (b) a shock sensor mounted within the housing assembly;
   (c) said shock sensor being able to yield at least three pulses in response to at least three respective shocks applied to the surface upon which the sensor configuration being mounted;
   (d) said shock sensor being mounted on said housing assembly using an internal clip acting to securely retain the shock sensor within the housing;
   (e) said internal clip including a protuberance designed to enhance the transference of mechanical energy from the sensor configuration to the shock sensor; and
   (f) a pulse emitted in response to a shock being indicative of said shock in a repeatable manner with error bar less than 7/40 of shock indication for all shock sensors of said plurality of shock sensors,
thereby substantially eliminating field calibration for the sensor configuration.

2. A surface-mountable shock sensor configuration, according to claim 1, wherein the sensor configuration has a top and a bottom cover.

3. A surface-mountable shock sensor configuration, according to claim 2, wherein the sensor configuration is made from a low cost material.

4. A surface-mountable shock sensor configuration according to claim 1, wherein the repeatable shock response is determinable from a pulse width range of the shock sensors.

5. A surface-mountable shock sensor configuration according to claim 4, wherein the protuberance yields a substantially reduced pulse width range compared to the pulse width range of shock sensor configurations without the protuberance.

6. A method of obtaining a repeatable shock response for a plurality of shock sensors replaceably mountable in a sensor configuration, in response to shocks applied to a surface upon which a the sensor configuration is mounted, the method comprising the steps of:
   (a) taking a housing assembly;
   (b) mounting a replaceable shock sensor within the housing assembly
      (i) using an internal clip acting to securely retain the shock sensor within the housing; wherein
      (ii) said internal clip including a protuberance designed to enhance the transference of mechanical energy from the sensor configuration to the shock sensor;
   such that a pulse emitted in response to a shock being indicative of said shock in a repeatable manner with error bar less than 7/40 of shock indication for all shock sensors of the plurality of shock sensors; and
   (c) said replaceable shock sensor being able to respond to at least three shocks applied to the surface upon which the sensor configuration being mounted by respective at least three pulses,
thereby substantially eliminating field calibration of the sensor configuration.

7. A method of obtaining a repeatable shock response according to claim 6, wherein the sensor configuration has a top and a bottom cover.

8. A method of obtaining a repeatable shock response according to claim 7, wherein the sensor configuration is made from a low cost material.

9. A method of obtaining a repeatable shock response, according to claim 6, wherein a protuberance is formed on the internal clip, the protuberance designed to enhance the transference of mechanical energy from the sensor configuration to the shock sensor.

10. A method of obtaining a repeatable shock response, according to claim 9, wherein the repeatable shock response is determined from a pulse width range of the shock sensors.

11. A method of obtaining a repeatable shock response according to claim 10, wherein the protuberance yields a substantially reduced pulse width range compared to the pulse width range of shock sensor configurations without the protuberance.

* * * * *